(12) United States Patent
Sarkar et al.

(10) Patent No.: US 11,673,114 B2
(45) Date of Patent: Jun. 13, 2023

(54) GRANULAR GREEN SORBENT MEDIA FOR FILTRATION OF CONTAMINATED WATER

(71) Applicant: The Trustees of the Stevens Institute of Technology, Hoboken, NJ (US)

(72) Inventors: Dibyendu Sarkar, West Orange, NJ (US); Viravid Na Nagara, Jersey City, NJ (US); Rupali Datta, Houghton, MI (US)

(73) Assignee: THE TRUSTEES OF THE STEVENS INSTITUTE OF TECHNOLOGY, Hoboken, NJ (US)

(*) Notice: Subject to any disclaimer, the term of this patent is extended or adjusted under 35 U.S.C. 154(b) by 492 days.

(21) Appl. No.: 16/840,165

(22) Filed: Apr. 3, 2020

(65) Prior Publication Data
US 2020/0316556 A1    Oct. 8, 2020

Related U.S. Application Data

(60) Provisional application No. 62/829,550, filed on Apr. 4, 2019.

(51) Int. Cl.
| | | |
|---|---|---|
| B01J 20/02 | (2006.01) | |
| B01D 39/20 | (2006.01) | |
| B01D 39/16 | (2006.01) | |
| C02F 1/28 | (2023.01) | |
| B01J 20/24 | (2006.01) | |
| B01J 20/30 | (2006.01) | |

(52) U.S. Cl.
CPC ...... *B01J 20/0248* (2013.01); *B01D 39/1646* (2013.01); *B01D 39/2031* (2013.01); *B01J 20/24* (2013.01); *B01J 20/3021* (2013.01); *B01J 20/3028* (2013.01); *C02F 1/288* (2013.01); *B01D 2239/0283* (2013.01); *B01D 2239/0407* (2013.01); *B01D 2239/10* (2013.01); *C02F 1/281* (2013.01); *C02F 1/286* (2013.01)

(58) Field of Classification Search
CPC ........ B01J 20/02; B01J 20/0248; B01J 20/24; B01J 20/3021; B01J 20/3028; B01D 39/1646; B01D 39/2031; B01D 2239/0283; B01D 2239/0407; B01D 2239/10; C02F 1/288; C02F 1/281; C02F 1/286
USPC ........................................................ 502/401
See application file for complete search history.

(56) References Cited

U.S. PATENT DOCUMENTS

| | | | |
|---|---|---|---|
| 2008/0050273 A1* | 2/2008 | Agblevor | A01K 1/0152 422/5 |
| 2016/0060139 A1* | 3/2016 | Davis | C02F 1/281 210/170.03 |
| 2019/0084857 A1* | 3/2019 | Aalto | B01J 20/28023 |
| 2019/0224646 A1* | 7/2019 | Davis | B01J 20/3028 |

* cited by examiner

*Primary Examiner* — Edward M Johnson
(74) *Attorney, Agent, or Firm* — Lewis Roca Rothgerber Christie LLP

(57) ABSTRACT

Filter media for treating contaminated water is produced from aluminum-based water treatment residuals (Al-WTR) commonly produced as a byproduct of water treatment plants. By processing the residuals into small granules, a superior green sorbent product is obtained with the functionality to adsorb contaminants, such as metals and certain nutrients in water. Biopolymers can be incorporated into the filter media to further enhance functionality and hydraulic characters.

20 Claims, 6 Drawing Sheets
(2 of 6 Drawing Sheet(s) Filed in Color)

FIG. 4(a)
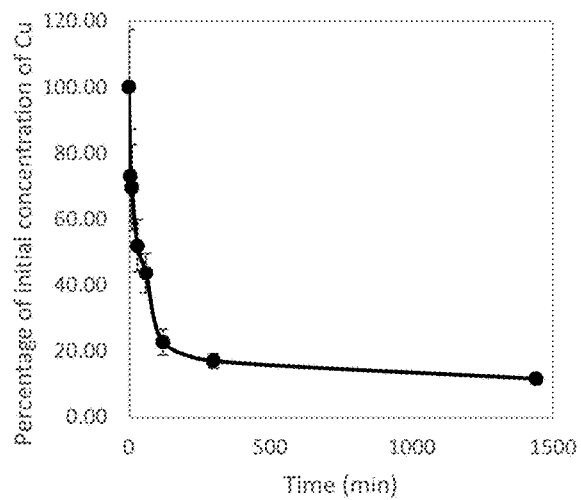
FIG. 4(b)
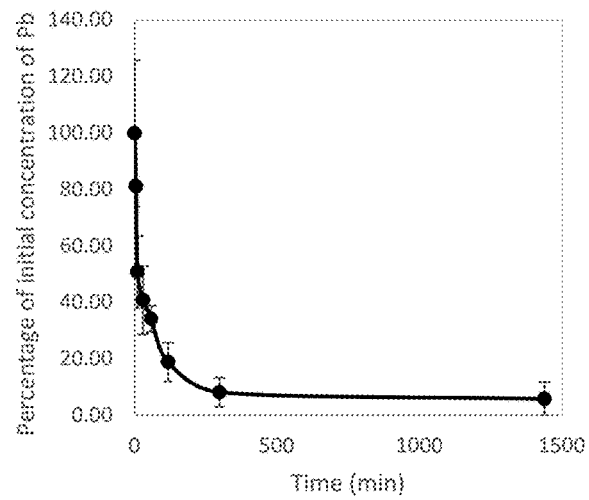
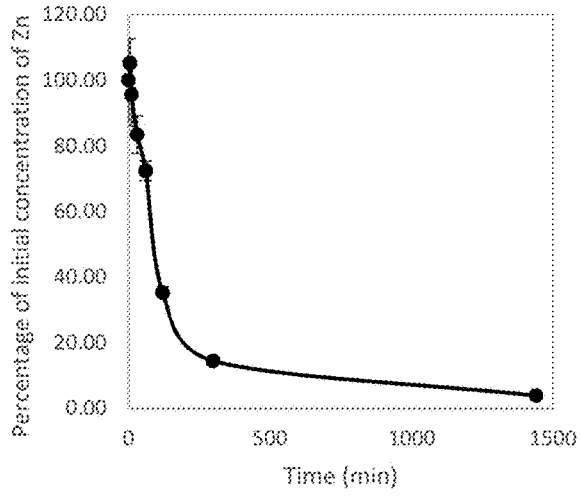
FIG. 4(c)
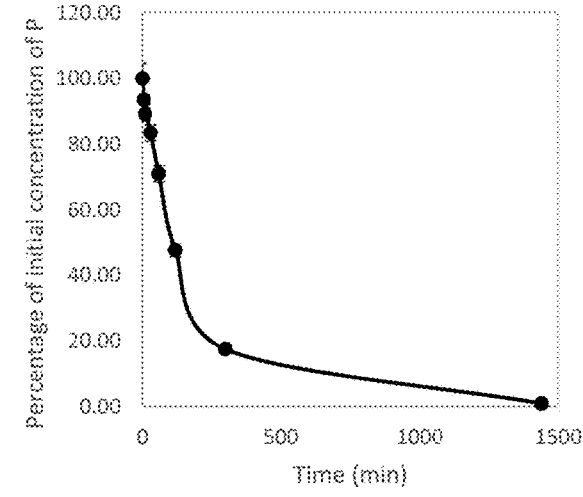
FIG. 4(d)

US 11,673,114 B2

GRANULAR GREEN SORBENT MEDIA FOR FILTRATION OF CONTAMINATED WATER

CROSS REFERENCE TO RELATED APPLICATIONS

This application claims priority from U.S. Provisional Patent Application Ser. No. 62/829,550 filed on Apr. 4, 2019, the contents of which are hereby expressly incorporated by reference herein.

FIELD OF THE INVENTION

The present invention pertains to the treatment of water. In particular, it relates to the production of a filter media from aluminum-based water treatment residuals (Al-WTR) generated during treatment of drinking water.

BACKGROUND OF THE INVENTION

There is a demand for inexpensive filter media that act as adsorbents for contaminants, such as metals (e.g., lead, copper, arsenic, etc.) and nutrients (e.g., phosphate and sulfate). However, a highly reactive filter media is typically a fine powder with high surface area that doesn't allow water to pass easily. An object of the present invention is therefore to provide optimized contaminant removal without hindering water flow to a significant degree. Another object is to provide a cost-effective filter media that does not generate toxic byproducts.

Unprocessed Al-WTR, typically in the form of a bulk solid, offers the capacity to function as filter media given its high inherent metal and nutrient removal potential. However, using unprocessed Al-WTR as filter media poses difficulty due its very low hydraulic conductivity, which barely allows water to percolate. To use unprocessed Al-WTR as filter media, it is mixed with other coarse materials such as sand. This may create preferential pathways for contaminant transport, thus affecting the effectiveness of the filter media, which lowers the pollutant removal performance of the media below what is generally required.

SUMMARY OF THE INVENTION

Al-WTR can be obtained from water treatment plants that use aluminum salts as primary coagulants. After testing for potential metal contaminants and confirming its non-hazardous nature, the Al-WTR compound can be evaluated for potential reactivity. Al-WTR that satisfies both, the requirement for non-toxicity, and reactivity, can be ground into appropriately fine-grained powder according to the intended application. The powder can then be mixed with solutions of biopolymers (e.g., alginate, chitosan, pectin, etc.) and an ionic cross-linker (e.g., calcium) to produce the Al-WTR granular product of the present invention. The resultant granular product allows water to pass through it without becoming too tightly packed by the flowing water. Granular Al-WTR, therefore, eliminates the tradeoff between flow and removal performance, which enables this low-cost, high removal performance material to be utilized as green sorbent media. When the inventive granular product is used in connection with a process adapted for the recycling of a waste product using entirely organic products, the result is an environmentally friendly green process that can be carried out quite inexpensively.

In an embodiment, the present invention involves a filter media for treating contaminated water, comprising processed aluminum water treatment residuals.

The filter media comprising aluminum water treatment residuals for treating contaminated water can be made by a process which, in an embodiment, involves the following steps. Aluminum water treatment residuals are dried and then ground. After evaluating the ground Al-WTR for potential toxicity using the Toxicity Characteristic Leaching Procedure (TCLP) method (US EPA Method 1311; see the section entitled "References" hereinbelow for full citation), the ground aluminum water treatment residuals are then evaluated for reactivity potential based on oxalate-extractable Al concentration. Next, the ground Al-WTR are sieved through a 1-mm sieve and then milled to micron- or nano-sized particles. The milled Al-WTR are added at the ratio of 15% (weight/volume) Al-WTR to 2% (weight/volume) alginate solution to create Al-WTR-alginate solution. Eggshell powder is added at the ratio of 6% (weight/volume) eggshell powder in 10% (volume/volume) acetic acid solution to create calcium solution. Al-WTR-alginate solution is added dropwise into the calcium solution to produce Al-WTR granules, which are left in the solution for 4 hours. The Al-WTR granules are thereafter washed with distilled water to remove excess calcium solution and then dried.

In another embodiment, the granular Al-WTR allows water to pass through the filter media without it becoming too tightly packed by the flowing water.

In further embodiments, the granular Al-WTR in the filter media eliminates the tradeoff between flow and removal performance.

In additional embodiments, the granular Al-WTR in the filter media enables a low-cost, high removal performance material to be utilized as green sorbent media.

In yet another embodiment, the inventive granular product in the filter media is used in connection with a process adapted for the recycling of a waste product that is further processed using entirely organic products.

BRIEF DESCRIPTION OF THE FIGURES

The patent or application file contains at least one drawing executed in color. Copies of the patent or patent application publication with color drawing(s) will be provided by the Office upon request and payment of the necessary fee.

For a better understanding of the present invention, reference is made to the following detailed description of various exemplary embodiments considered in conjunction with the accompanying figures, in which:

FIGS. 4a-4d are graphs illustrating results for kinetic experiment for, respectively, Cu (see FIG. 4a), Pb (see FIG. 4b), Zn (see FIG. 4c), and P (see FIG. 4d);

DETAILED DESCRIPTION OF THE EXEMPLARY EMBODIMENTS

Figure 1A:
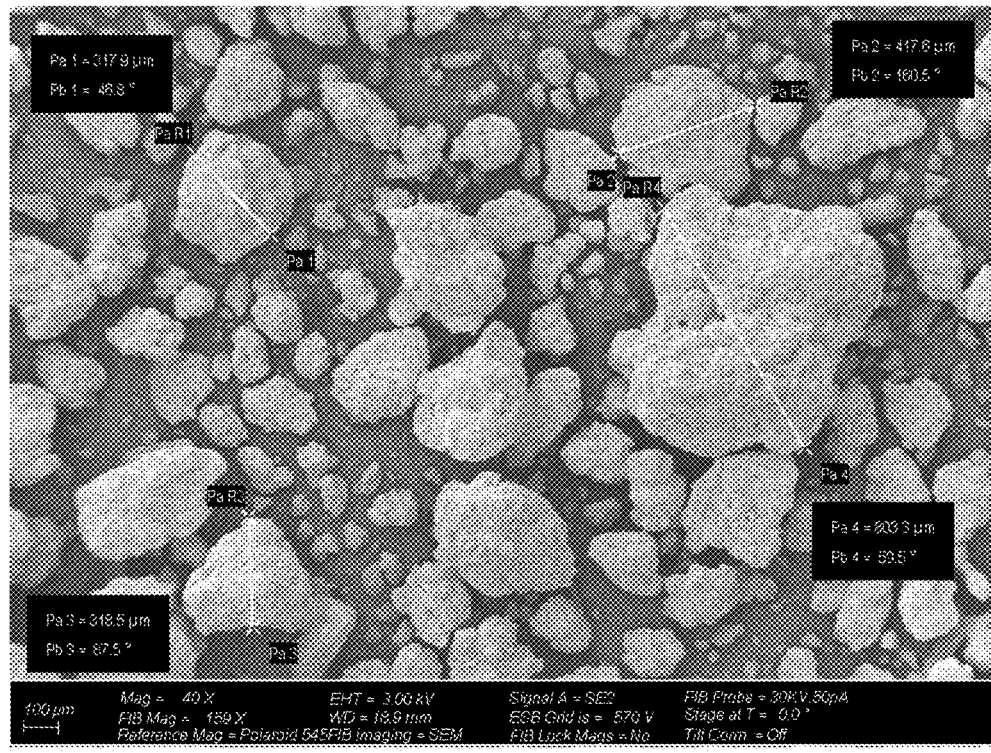
FIGS. 1a-1b are SEM images of Al-WTR shown before milling (see FIG. 1a) and after milling to micron-sized particles (see FIG. 1b)

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, and some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; exemplary embodiments are provided merely to be illustrative. Among other things, for example, subject matter may be embodied as methods, devices, components, or systems. The following detailed description is, therefore, not intended to be taken in a limiting sense.

Throughout the specification and/or claims, terms may have nuanced meanings suggested or implied in context beyond an explicitly stated meaning. Likewise, the phrase "in one embodiment" as used herein does not necessarily refer to the same embodiment and the phrases "in another embodiment" and "other embodiments" as used herein do not necessarily refer to a different embodiment. It is intended, for example, that covered or claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Aluminum-based water treatment residuals can be obtained from any drinking water treatment facility that uses aluminum salts, such as alum ($Al_2(SO_4)_3 \cdot 14H_2O$), aluminum chloride, or polyaluminum chloride (PAC), as primary coagulants.

First, the Al-WTR is dried in order to remove moisture. This can be done in an oven at 105° C. for 24 hours. After drying, the Al-WTR is passed through a sieve (e.g., a 9.5 mm sieve).

To ensure the Al-WTR provided is suitable for application as an environmentally friendly (i.e., non-hazardous) sorbent, it needs to be evaluated for potential toxicity using the Toxicity Characteristic Leaching Procedure (TCLP) method (US EPA Method 1311). Such a procedure may be implemented by first adding 5 g of Al-WTR with a particle size of approximately 1 mm in diameter or less to 96.5 mL of deionized water in a beaker, covering the beaker with a watch glass, and stirring the beaker's contents with a magnetic stirrer.

If the pH of the resultant Al-WTR slurry is less than 5.0, then a first extraction fluid is used, which can be prepared by adding 5.7 mL glacial acetic acid to 500 mL of deionized water, followed by adding 64.3 mL of 1M NaOH and diluting to 1 L. The first extraction fluid will have a pH of 4.93±0.05 when properly prepared.

On the other hand, if the measured pH is more than 5.0, the Al-WTR slurry is mixed with 3.5 mL 1M HCl, covered with a watch glass, heated to 50° C., and held at 50° C. for 10 min. After the solution cools to room temperature, the pH is recorded. If the pH is less than 5.0, extraction fluid #1 is used; otherwise a second extraction fluid is used, which can be prepared by diluting 5.7 mL of glacial acetic acid to 1 L with deionized water. The pH of the second extraction fluid will be 2.88±0.05 when properly prepared.

To test toxicity in accordance with the aforementioned protocol, 3 aliquots of 100 grams of dried and sieved Al-WTR can be added to a vessel (e.g., an extractor bottle). In an embodiment, 2 L of extraction fluid is added to the vessel, which can then be shaken (e.g., at 28-32 rpm for 16-20 hours in a rotary shaker). It will be appreciated by those skilled in the art that the shaking step, as well as any shaking or stirring step described subsequently, can be conducted at any appropriate frequency that is sufficient to homogenize the solution without causing loss of sample or solution. The vessel's contents are then filtered (e.g, with a glass fiber filter) and the sample can be evaluated for the presence of the eight toxic heavy metals set forth by the Resource Conservation and Recovery Act (RCRA 8). The concentrations of RCRA 8 metals in the extracts can be evaluated against regulatory levels to determine whether the Al-WTR is non-hazardous. If, for any RCRA 8 metal, the concentration is at 80% or higher of the prescribed regulatory level, the Al-WTR can be washed with 10% (volume/volume) acetic acid, which can be prepared by diluting concentrated vinegar with distilled water. After washing, the Al-WTR is subject to the same TCLP process, beginning with the addition of the extraction fluid. This is repeated as necessary until it can be verified that the metal concentrations have gone below the acceptable level. The TCLP values for toxic metals for a representative Al-WTR used as source materials in an embodiment of the invention are well below the hazardous waste toxicity characteristic criteria as defined in Title 40 of the Code of Federal Regulations (CFR), Part 261.24 (Table 1):

TABLE 1

Toxicity characteristic values of RCRA 8 metals in Al-WTR using the TCLP method

| Analyte | Milled Al-WTR (µg/L) | EPA Regulatory level (µg/L)* |
|---|---|---|
| Ag | 6.47 | 5,000 |
| As | 11.40 | 5,000 |
| Ba | 1439 | 100,000 |
| Cd | 0.73 | 1,000 |
| Cr | 14.52 | 5,000 |
| Hg | BDL** | 200 |
| Pb | 18.50 | 5,000 |
| Se | 81.71 | 1,000 |

*TCLP criterion: maximum concentrations of contaminants for the toxic characteristics from Title 40 CFR 261.24 - Toxicity characteristic
**BDL—Below detection limit Once the Al-WTR is deemed non-hazardous, its potential effectiveness as a sorbent is determined by measuring the concentration of amorphous Al oxide or Al hydroxide, which are expected to provide the majority sites for metal and phosphate and sulfate sorption. Amorphous oxides/hydroxides are desirable as they have significantly higher specific surface area than the corresponding crystalline structures. Amorphous Al oxide/hydroxide can be extracted using the ammonium oxalate method disclosed in Jackson et al. 1986 (see the section entitled "References" hereinbelow for full citation). Oven-dried and sieved Al-WTR (0.25 g) can be added to a 100-mL polypropylene centrifuge tube, followed by addition of 50 mL of 0.2 M ammonium oxalate solution adjusted to pH 3.0 using $NH_4OH$ or HCl. The centrifuge tube may be capped and wrapped with aluminum foil to eliminate light. The mixture can subsequently be shaken for 2 hours in the dark on a reciprocating shaker and then centrifuged. Next, the supernatant may be analyzed for Al. In an embodiment, the Al-WTR is only used for generating granulated sorbent media if the oxalate-extractable Al concentration exceeds a certain threshold concentration (e.g., 100 ppm). A representative composition of the filter media of the invention is provided below, wherein the numbers shown are the mean of three replicates ±one standard deviation:

TABLE 2

Chemical composition of filter media of the invention

| Analyte | Oxalate Extractable (mg/kg) | Total (mg/kg) |
|---|---|---|
| Ag | BDL** | 0.21 ± 0.11 |
| Al | 98202 ± 1479 | 127364 ± 3013 |
| As | 23.50 ± 21.92 | 11.30 ± 6.60 |
| Ba | 94.38 ± 1.77 | 163.9 ± 3.11 |
| Cd | BDL** | 1.55 ± 0.11 |
| Cr | 4.92 ± 0.43 | 25.51 ± 0.73 |
| Cu | 25.74 ± 0.76 | 46.4 ± 1.05 |
| Fe | 6814.3 ± 109.5 | 21754 ± 515.9 |
| Hg | BDL** | BDL** |
| Mn | 4107.4 ± 74.84 | 4599.6 ± 87.66 |
| Ni | 3.66 ± 0.93 | 20.09 ± 0.35 |
| P | 4331.3 ± 65.71 | 4975.4 ± 87.99 |
| Pb | 5.95 ± 3.36 | 18.18 ± 2.09 |
| Se | 20.92 ± 17.91 | 5.41 ± 7.41 |
| Zn | 39.3 ± 1.39 | 101.93 ± 3.44 |

**BDL—Below detection limit

Al-WTR that passes the TCLP test and has an oxalate-extractable Al concentration greater than 100 ppm is suitable for further use. First, the product can be ground using, for example, a standard kitchen grinder in order to pass through a 1-mm sieve. The <1 mm fraction is then milled based on reactivity requirements. Grinding the product into particles of a smaller size results in a higher total surface area and, consequently, enables greater reactivity. In embodiments in which high reactivity is desirable, the Al-WTR may be milled to form nanoscale particles. While in cases where extremely high reactivity is not necessary, micron-sized particles may be satisfactory.

Figure 1B:
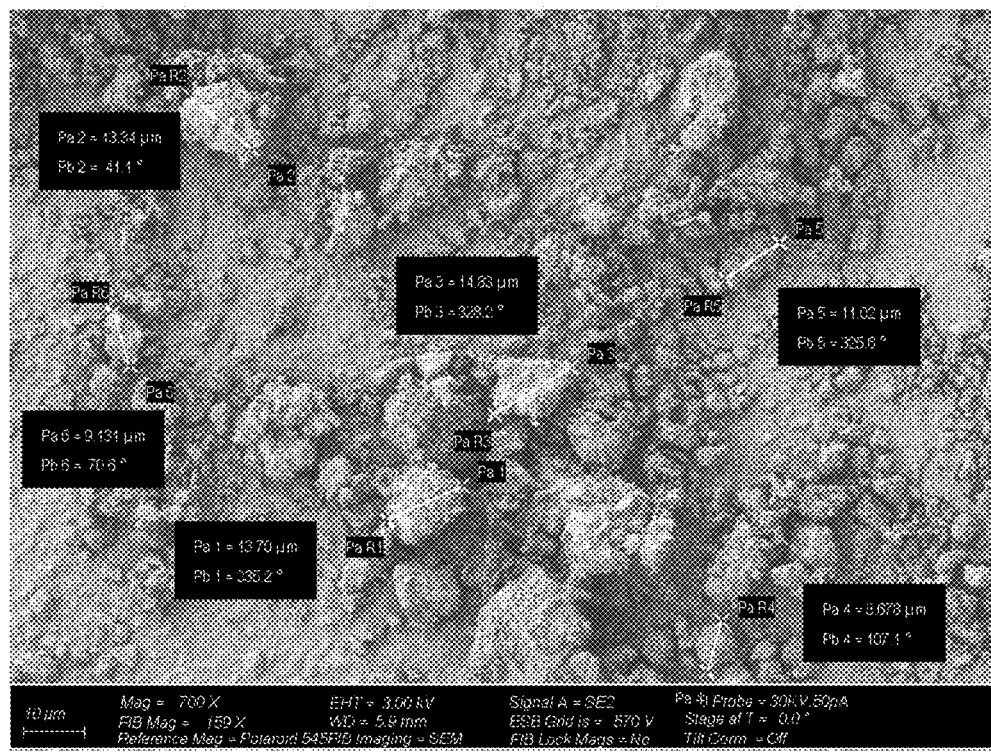
Figure 2A:
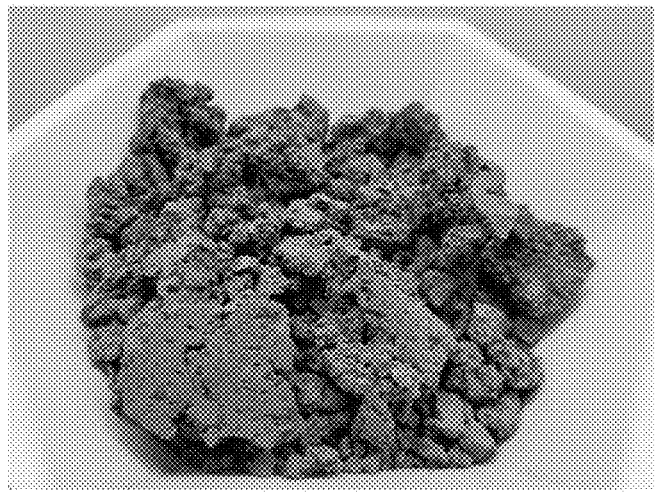
FIGS. 2a-2c show Al-WTR after drying (see FIG. 2a), after drying, grinding, and passing through a 1-mm sieve (see FIG. 2b), and after drying, grinding, passing through a 1-mm sieve, and milling (see FIG. 2c)
Figure 2B:
Figure 2C:
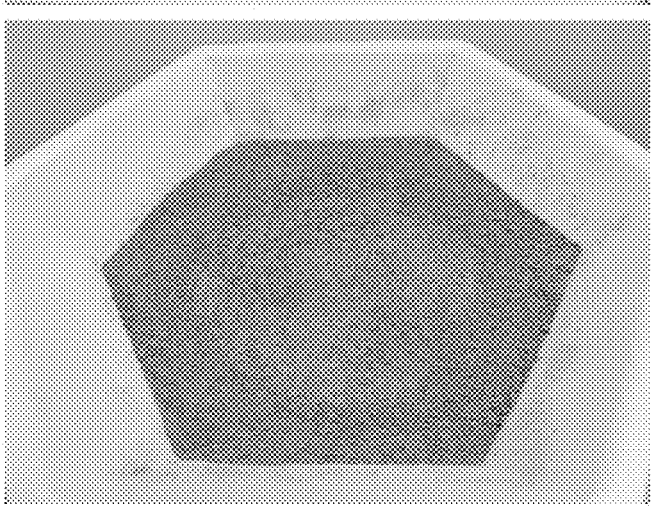
Figure 3:
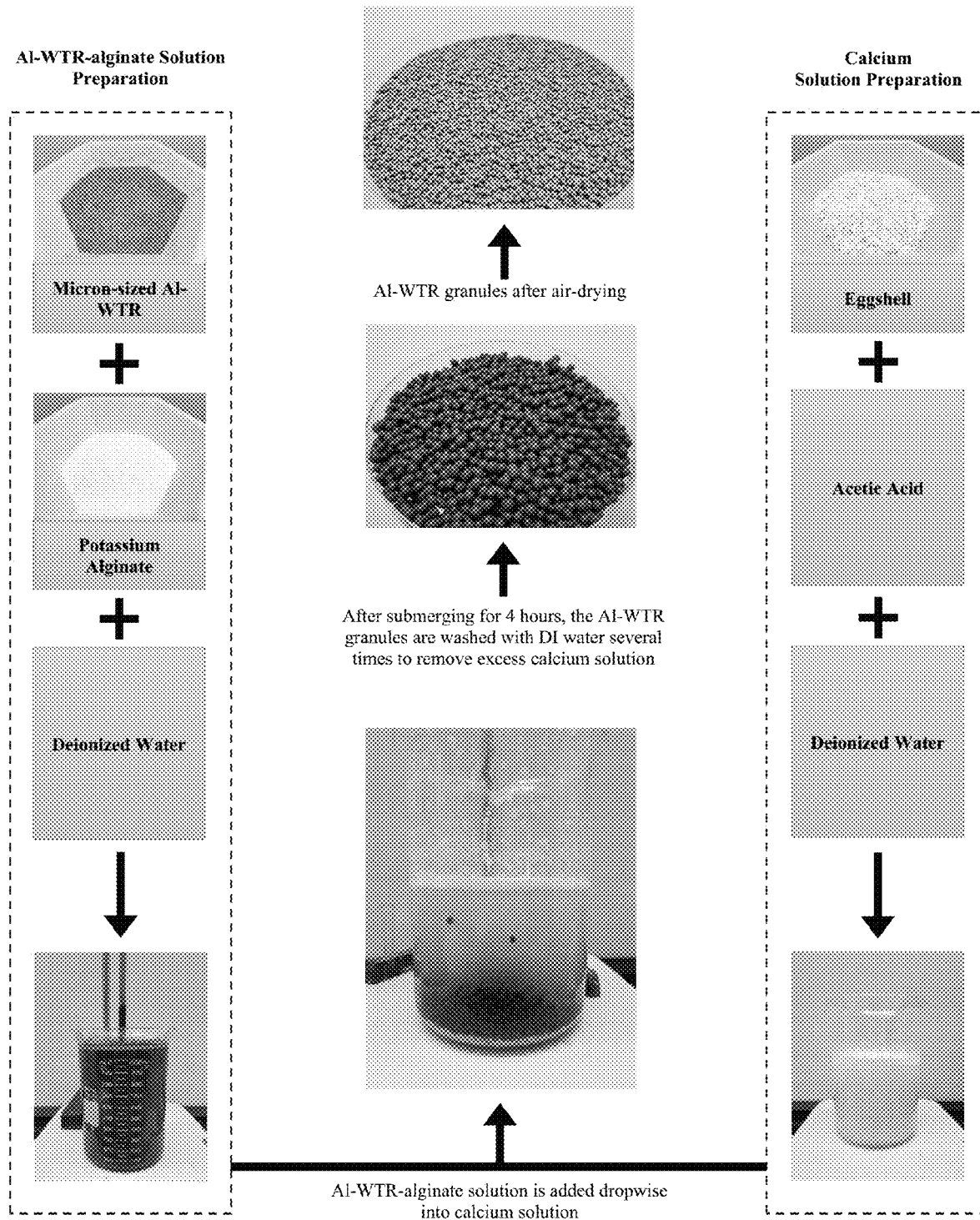
FIG. 3 is a production flow chart for generating Al-WTR granules.
Figure 5A:
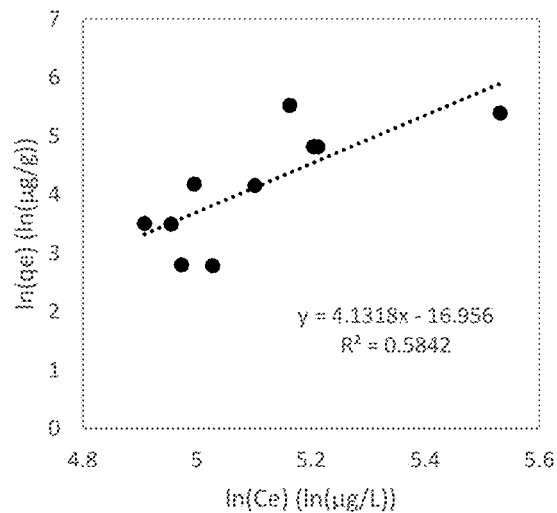
FIGS. 5a-5d depict linearized Freundlich Isotherms, respectively, for Cu (see FIG. 5a), Pb (see FIG. 5b), Zn (see FIG. 5c), and P (see FIG. 5d)
Figure 5B:
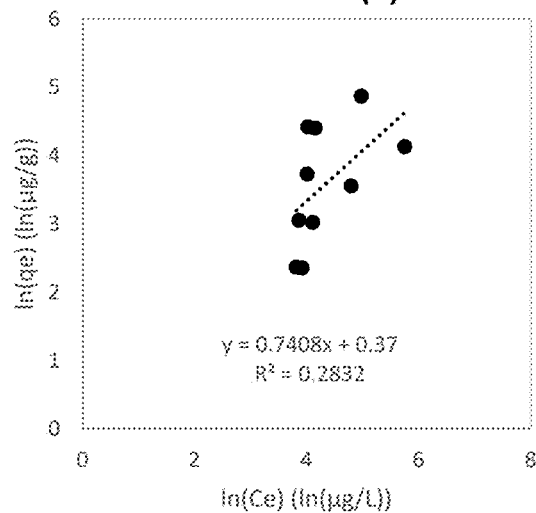
Figure 5C:
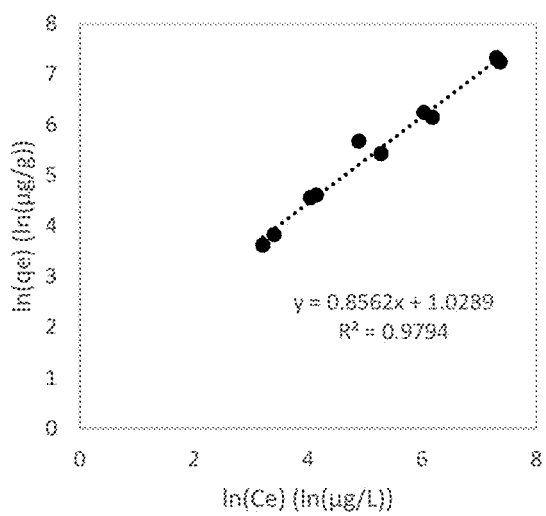
Figure 5D:
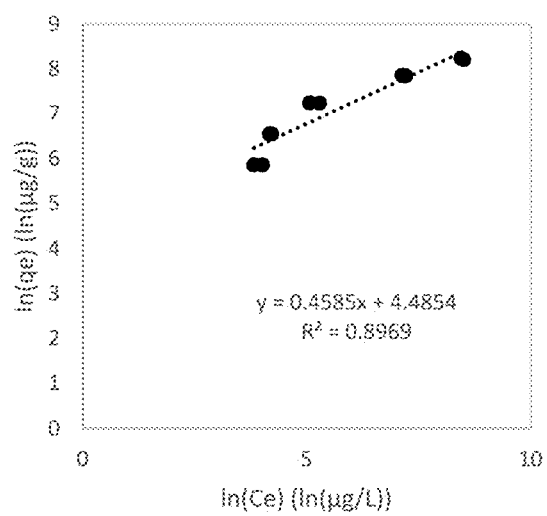
Figure 6A:
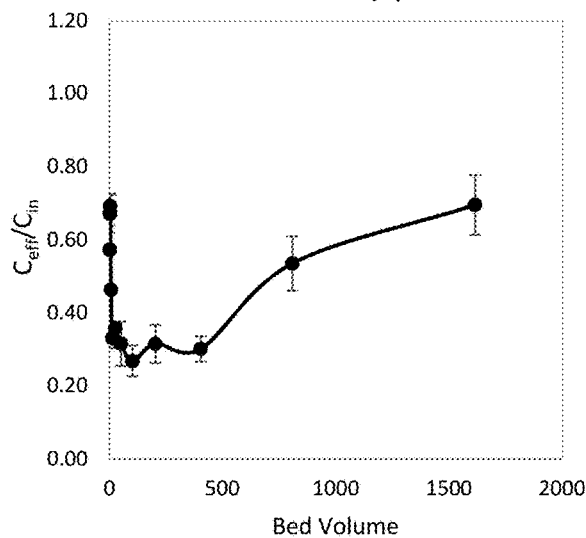
FIGS. 6a-6d disclose the respective results for a column experiment for Cu (see FIG. 6a), Pb (see FIG. 6b), Zn (see FIG. 6c), and P (see FIG. 6d).
Figure 6B:
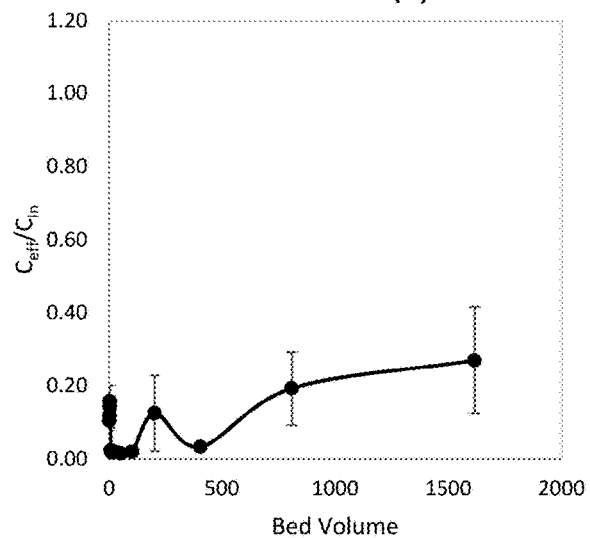
Figure 6C:
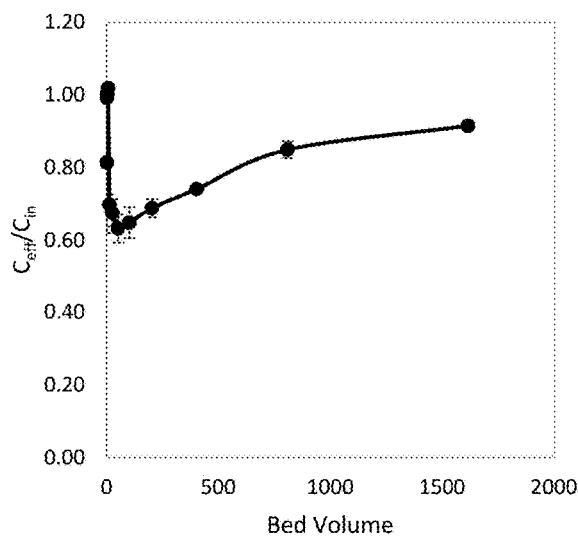
Figure 6D:
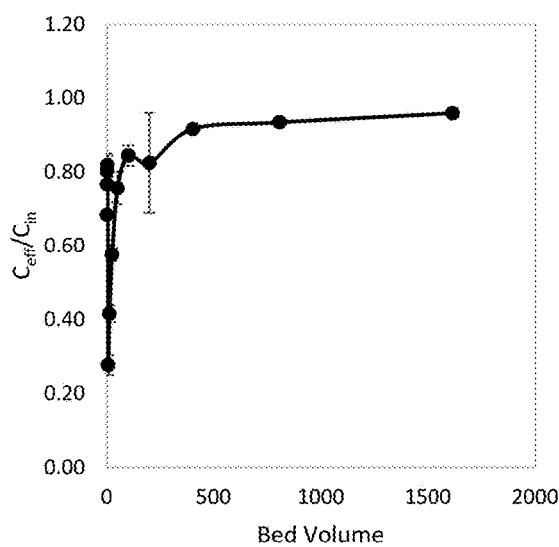

For example, to prepare micron-sized Al-WTR particles, the <1 mm fraction of Al-WTR may be milled by a planetary ball mill at 290 rpm (tray rotating) and 580 rpm (grinding jars rotating) for 18 minutes as taught by Balintova et al., 2012 (see the section entitled "References" hereinbelow for full citation). To prepare nanoscale powdered Al-WTR, the micron-sized fraction may be further milled at 650 rpm (tray rotating) for 75 minutes. Isopropyl alcohol may be added to the Al-WTR to maintain an optimal viscosity for milling. Milling may be paused for 10 minutes every 3 minutes to avoid overpressure as prescribed by Elkhatib et al., 2015 (see the section entitled "References" hereinbelow for full citation). A representative morphology and particle size of the micron-sized Al-WTR of the filter media of the invention is provided below, which were characterized using a scanning electron microscope (SEM, Zeiss Auriga Dual-Beam FIB-SEM) as illustrated in FIG. 1a and FIG. 1b.

Once ground to the appropriate size, the granulated Al-WTR product may be formed. In an embodiment, a biopolymer solution will be prepared. The biopolymer can be either alginate, chitosan, pectin or gellan gum. If alginate is chosen as the biopolymer, a 2% (weight/volume) alginate solution may be prepared by mixing 10 g of potassium alginate in 500 mL of distilled deionized water and stirring for 1 hour. After the preparation of the alginate solution, 75 g of powdered-Al-WTR can be added to the solution and stirred for 10 hours following which a crosslinked polymer mesh is created.

To create a crosslinked polymer mesh, calcium ions are used as an ionic cross-linker. In an embodiment, a 6% (weight/volume) calcium solution is prepared by mixing (e.g., by stirring for 1 hour) commercially available eggshell powder in 10% (volume/volume) acetic acid solution, which is prepared by diluting concentrated vinegar with distilled water. Al-WTR-alginate solution may be added dropwise in the calcium solution to produce Al-WTR granules, which are left in the solution for 4 hours and then washed with distilled water several times to remove excess calcium solution. The washed granules can finally be air-dried or oven-dried at low temperature (e.g., at 45° C. for 24 hours). With the addition of calcium and potassium alginate as such, a hardened shell is formed that entraps Al-WTR powder. In another embodiment, a baking means at high temperature (e.g., at 450° C.) can be employed to harden the product into its final form, but this will require more energy consumption. Regardless of the method employed, the result is a granular Al-WTR product configured to pass through water while retaining the ability to capture contaminants.

The Al-WTR granules made via the process described hereinabove is non-toxic, recycled from a waste product (i.e., green from an environmental point of view), as well as relatively inexpensive to produce (i.e., green from a economic point of view). If potassium alginate is the biopolymer of choice, the final product is a water-insoluble, dark-colored sphere, which has a diameter of approximately 2-5 mm and a specific density of approximately 1.22-1.25 g/mL. It can be used as sorbent for contaminants, such as metals, such as lead, copper, zinc, cadmium, arsenic, chromium, and nutrients, such as phosphate and sulfate, in water.

Kinetic Experiments

To evaluate the effectiveness of the Al-WTR granules in adsorbing representative metals as a function of time, kinetic experiments were conducted in 1-L bottles, containing 800 mL of synthetic stormwater and 8 g of Al-WTR granules. Synthetic stormwater was prepared using the respective nitrate salts for Cu, Pb, and Zn, and disodium phosphate ($Na_2HPO_4$) for P (TABLE 3 A separate kinetic experiment was conducted for each individual pollutant. The pH of the solutions was adjusted to pH 7.0 using $HNO_3$ and NaOH and maintained at pH 7 by adding PIPES buffer to the concentration of 10 mM. For ionic strength, sodium nitrate ($NaNO_3$) was used as a background electrolyte at the concentration of 0.1 M. The bottles were placed on a rotary shaker at 180 rpm. Representative samples were collected at different times (5, 10, 30 minutes, and 1, 2, 5, 24 hours). Then, the samples were filtered through a 0.45-μm nylon syringe filter and analyzed using an inductively coupled plasma—optical emission spectrometer (ICP-OES, 5100 Agilent Technologies, CA).

TABLE 3

Composition of synthetic stormwater.

| Parameter | Source | Target Concentration |
|---|---|---|
| pH | $NaOH/HNO_3$ | 7 |
| Cu | $Cu(NO_3)_2 \cdot 5H_2O$ | 100 (μg/L) |
| Zn | $Zn(NO_3)_2 6H_2O$ | 800 (μg/L) |
| Pb | $Pb(NO_3)_2$ | 100 (μg/L) |
| Phosphorus | $Na_2HPO_4$ | 3 (as P) (mg/L) |
| PIPES | $C_8H_{18}N_2O_6S_2$ | 10 (mM) |
| Ionic strength | $NaNO_3$ | 0.1 (M) |

Kinetic Experiment Results

The kinetic results are shown in FIGS. 4a-4d. Approximately 30% removal of Cu and 50% removal of Pb was achieved within 10 minutes, while approximately 30% removal of Zn and P was found after 60 minutes. More than 80% removal of Pb was found within 2 hours, while such removal was found after 5 hours for Cu, Zn, and P. After 24 hours, the removal efficiencies of Cu, Pb, Zn, and P were 88%, 94%, 96%, and 99%, respectively.

Adsorption Isotherm Experiments

Adsorption isotherm experiments were performed to evaluate the effectiveness of the Al-WTR granules in adsorbing representative metals as a function of initial concentrations and determine equilibrium adsorption parameters. Varying masses of Al-WTR granules, ranging from 0.1-1.6 g, were placed in 50-mL centrifuge tubes with 40 mL of the synthetic stormwater as shown in TABLE 3 with a single pollutant with appropriate initial concentrations. The centrifuge tubes were placed on a rotary shaker at 180 rpm for 24 hours. After the designated time, samples were collected, filtered through a 0.45-μm nylon syringe filter, and analyzed using an ICP-OES.

Adsorption Isotherm Experiment Results

The adsorption isotherm results for Cu, Pb, Zn, and P onto the Al-WTR granules were analyzed using the Freundlich isotherm model. The results of each target pollutant were used to calculate mass-normalized adsorption capacity ($q_e$) of pollutant on sorbent which is expressed as:

$$q_e = \frac{(C_0 - C_e)V}{m} \times 100\%$$

Where $C_0$ and $C_e$ are the initial and equilibrium concentrations of an adsorbate in bulk solution, respectively; V is the volume of bulk solution; and m is the mass of adsorbent. The Freundlich isotherm model, which was used to fit the experimental data at chemical equilibrium, is expressed as:

$$q_e = K_f C_e^{1/n}$$

Where $K_f$ is Freundlich isotherm capacity parameter and 1/n is Freundlich isotherm intensity parameter. The two parameters can be determined by the linearized form of the Freundlich equation:

$$\ln(q_e) = \ln(K_f) + \frac{1}{n}\ln(C_e)$$

The linear plot of the Freundlich isotherm for Cu, Pb, Zn, and P onto Al-WTR granules is shown in FIGS. 5a-5d. The Freundlich isotherm capacity and Freundlich isotherm intensity parameters were determined from the slope and the intercept of the plot and are documented in TABLE 4. The Freundlich adsorption isotherm model was well fitted with the experimental data for Zn and P, while the fit was poor for Pb and Cu. The Freundlich isotherm capacity for Zn and P was 2.80 and 88.70 $(\mu g/g)(L/\mu g)^{1/n}$, respectively.

TABLE 4

Freundlich adsorption modeling parameters

| Target Pollutant | $K_f (\mu g/g)(L/\mu g)^{1/n}$ | n | $R^2$ |
|---|---|---|---|
| Cu | 4.33E−08 | 1.61E−02 | 0.58 |
| Pb | 1.45 | 0.48 | 0.28 |
| Zn | 2.80 | 0.42 | 0.98 |
| P | 88.71 | 0.63 | 0.90 |

Column Experiments

Clear polyvinyl chloride pipes with a length of 30 cm and an inner diameter of 2.54 cm equipped with 2.54 cm male adapter at both ends of the pipes were used as columns for experiments under dynamic, flow-through conditions. A 2.54 cm center-drilled dome cap equipped with a ⅛"×⅛" adapter and ⅛" tubing was installed at the bottom end of each column as an outlet. A circular layer of the catch basin insert material—non-woven polypropylene geotextile (1200FF, NDS Inc., California)—and glass wool were installed at the bottom of each column to retain the Al-WTR granules within the column. The Al-WTR granules were loaded into the column to the depth of 10 cm. Synthetic stormwater with an exaggerated concentration of Cu, Pb, Zn, and P (6.36, 8.16, 11.70, 20 mg/L, respectively) was prepared by diluting stock solutions of each metal with deionized water. Each pollutant was evaluated in a separate column experiment. The synthetic stormwater was supplied continuously at the flow rate of 8 mL/min from the top of the columns, using a peristaltic pump (Ismatec Reglo Digital, Cole-Parmer, Ill.). The column effluent samples were collected at various time periods, filtered through a 0.45-μm nylon syringe filter and analyzed using an ICP-OES.

Column Experiment Results

The breakthrough curves are presented in normalized effluent pollutant concentration, which is the ratio of pollutants at time t to the influent pollutant concentration, versus bed volume (BV), which was calculated as BV=Q/V, where Q is the accumulated volume of the water passing through the column, and V is the volume of the filter bed (50.67 mL).

The relative order of metal removal capacity of the Al-WTR granules under the dynamic, flow-through conditions was found to be Pb>Cu>Zn>P. At the beginning, the effluent concentration of the pollutants was relatively high, potentially due to the non-wetted surface of the granules. However, the effluent concentrations rapidly decreased right after 6 BV. The effluent concentration of Cu and Pb were relatively constant until 400 BV, while the effluent concentration gradually increased for Zn. In the case of P, the effluent concentration sharply increased between 6 and 101 BV and remained relatively constant after 404 BV. After 1616 BV, the effluent concentration of Pb was still well below the initial concentration (%27 of the initial concentration). The effluent concentration of Cu, Zn, and P after 1616 BV were found to be 70%, 92%, and 96% of the initial concentration, respectively.

Suspended Solids Removal Experiments

The Al-WTR granules were evaluated for their effectiveness in the removal of suspended solids. The evaluation was performed in the same columns used in the column experiment. A plastic mesh was placed at the bottom end of the column to retain the Al-WTR granules. The Al-WTR granules were loaded into the column to the depth of 10 cm. Prior to testing, the Al-WTR granules were flushed with deionized water several times to remove the residual dust, as well as to allow the media to approach a typical, wet operating condition. A commercial ground silica product, SIL-CO-SIL® 250 (SCS 250), was used as the surrogate for total suspended solid (TSS). This product is manufactured by the US Silica Company. The SCS 250 was dissolved in deionized water to achieve the target TSS of 300 mg/L. The solutions were periodically shaken to encourage the dissolution of any aggregates for 1 hour. Then, the solutions were supplied from the top of the columns. The total volume of the effluent samples was measured prior to measuring TSS by gravimetric determination.

Suspended Solids Removal Results

The average TSS removal efficiency for the Al-WTR granules was found to be 77.7% as shown in TABLE 5.

TABLE 5

TSS removal results

| Replicate No. | Influent TSS (mg/L) | Effluent TSS (mg/L) | % Removal |
|---|---|---|---|
| 1 | 0.298 | 0.065 | 78.23 |
| 2 | 0.298 | 0.071 | 76.16 |
| 3 | 0.299 | 0.064 | 78.61 |
| Average | 0.299 | 0.067 | 77.67 |
| SD | 0.000 | 0.004 | 1.32 |
| % RSD | 0.138 | 5.793 | 1.70 |

REFERENCES

The following references appear throughout the present Specification. These references are hereby incorporated herein by reference:

USEPA (1992). Method 1311 Toxicity characteristic leaching procedure (TCLP). Washington D.C., USA.

Jackson, M. L., Lim, C. H., & Zelazny, L. W. (1986). Oxides, Hydroxides, and Aluminosilicates. Methods of Soil Analysis: Part 1—Physical and Mineralogical Methods, 101-150.

Balintova, M., Holub, M., & Singovszka, E. (2012). Study of iron, copper and zinc removal from acidic solutions by sorption. Chemical Engineering Transactions, 28, 175-180.

Elkhatib, E. A., Mandy, A. M., & Salama, K. A. (2015). Green synthesis of nanoparticles by milling residues of water treatment. Environmental Chemistry Letters, 13(3), 333-339.

It will be understood that the embodiments described herein are merely exemplary and that a person skilled in the art may make many variations and modifications without departing from the spirit and scope of the present invention. Such other embodiments, etc. can be glaned, for example, from FIGS. 2a-2c FIG. 3 and FIGS. 6a-6d and their associated descriptions hereinabove. All such variations and modifications are intended to be included within the scope of the present invention.

The invention claimed is:

1. A filter media for treating contaminated water, comprising a plurality of particles of powdered aluminum-based water treatment residuals, each particle of at least some of said plurality of particles being entrapped in a corresponding shell which includes calcium and potassium alginate.

2. The filter media of claim 1, wherein there are a plurality of entrapped particles, said entrapped particles being in the form of granules.

3. The filter media of claim 2, wherein said granules have varying sizes.

4. The filter media of claim 3, wherein said granules have a spherical shape with a diameter of approximately 2-5 mm.

5. The filter media of claim 4, wherein said granules have a specific density of approximately 1.22-1.25 g/ml.

6. The filter media of claim 2, wherein said granules are non-toxic.

7. The filter media of claim 2, wherein said granules are water insoluble.

8. The filter media of claim 2, wherein said granules have a hydraulic conductivity sufficient to allow water flow therethrough without becoming too tightly packed in response to water flowing through said granules.

9. The filter media of claim 8, wherein said granules function as adsorbents for contaminants in water flowing through said granules.

10. The filter media of claim 9, wherein said granules function as adsorbents for nutrients in water flowing through said granules.

11. The filter media of claim 2, wherein said granules constitute a green sorbent product.

12. The filter media of claim 1, wherein said particles have an oxalate-extractable aluminum concentration greater than 100 ppm.

13. The filter media of claim 1, wherein said aluminum-based water treatment residuals are the byproduct of drinking water treatment plants.

14. The filter media of claim 13, wherein said aluminum-based water treatment residuals are dry.

15. The filter media of claim 14, wherein said plurality of particles are the product of a grinding process.

16. The filter media of claim 15, wherein said plurality of particles are non-toxic.

17. The filter media of claim 16, wherein said plurality of particles have an oxalate-extractable aluminum concentration greater than 100 ppm.

18. The filter media of claim 17, wherein said plurality of particles are micron-sized.

19. The filter media of claim 17, wherein said plurality of particles are nano-sized.

20. The filter media of claim 1, wherein said filter media functions as an adsorbent for contaminants and nutrients in storm water.

\* \* \* \* \*